United States Patent
Nonaka et al.

(10) Patent No.: US 11,172,610 B2
(45) Date of Patent: Nov. 16, 2021

(54) TRANSMISSION FOR LAWN MOWER

(71) Applicant: KAAZ CORPORATION, Okayama (JP)

(72) Inventors: Masaki Nonaka, Okayama (JP); Koichi Ogawa, Okayama (JP); Takanori Ishii, Okayama (JP)

(73) Assignee: KAAZ CORPORATION, Okayama (JP)

( * ) Notice: Subject to any disclaimer, the term of this patent is extended or adjusted under 35 U.S.C. 154(b) by 442 days.

(21) Appl. No.: 16/327,962

(22) PCT Filed: Aug. 8, 2017

(86) PCT No.: PCT/JP2017/028714
§ 371 (c)(1),
(2) Date: Feb. 25, 2019

(87) PCT Pub. No.: WO2018/043064
PCT Pub. Date: Mar. 8, 2018

(65) Prior Publication Data
US 2019/0183041 A1    Jun. 20, 2019

(30) Foreign Application Priority Data
Aug. 31, 2016   (JP) .............................. JP2016-168803

(51) Int. Cl.
*F16H 57/021*   (2012.01)
*F16H 57/025*   (2012.01)
(Continued)

(52) U.S. Cl.
CPC ........... *A01D 34/6806* (2013.01); *F16H 7/06* (2013.01); *F16H 57/021* (2013.01);
(Continued)

(58) Field of Classification Search
CPC .. A01D 34/6806; F16H 57/021; F16H 57/025; F16H 2057/02086; F16H 2057/0056; F16H 7/06; F16H 55/30
See application file for complete search history.

(56) References Cited

U.S. PATENT DOCUMENTS 4,811,552 A * 3/1989 Fujimoto ............... A01D 34/69
464/139
5,222,348 A    6/1993 Woodling
(Continued)

FOREIGN PATENT DOCUMENTS

EP    0803180 A1   10/1997
JP    63-33710 U    3/1988
(Continued)

OTHER PUBLICATIONS

The Extended European Search Report (EESR) issued in European Patent Application No. 17846073.9 dated Mar. 2, 2020.
(Continued)

*Primary Examiner* — Alicia Torres
*Assistant Examiner* — Matthew Ian Neal
(74) *Attorney, Agent, or Firm* — Pearne & Gordon LLP (57) ABSTRACT

A transmission for a lawn mower, for transmitting an output of a drive source to a driving wheel, the transmission including a speed-change transmission device and a power transmission device movably coupled to the speed-change transmission device. The power transmission device includes a first power transmission device coupled to the speed-change transmission device and a second power transmission device to which the driving wheel is coupled, and the first power transmission device and the second power transmission device are movably coupled to each other.

5 Claims, 12 Drawing Sheets

(51) Int. Cl.
*F16H 7/06* (2006.01)
*F16H 57/02* (2012.01)
*A01D 34/68* (2006.01)
*A01D 101/00* (2006.01)

(52) U.S. Cl.
CPC ... *F16H 57/025* (2013.01); *A01D 2034/6837* (2013.01); *F16H 2057/02086* (2013.01)

(56) References Cited

U.S. PATENT DOCUMENTS

| | | | | |
|---|---|---|---|---|
| 5,335,496 | A * | 8/1994 | Azuma | B60K 17/105 60/487 |
| 5,377,774 | A | 1/1995 | Lohr | |
| 5,398,489 | A * | 3/1995 | Oshima | A01D 34/68 56/17.2 |
| 6,196,367 | B1 * | 3/2001 | Hanabusa | A01D 34/6806 192/3.54 |
| 7,063,177 | B1 * | 6/2006 | Crumly | A01D 34/6806 180/19.1 |
| 7,793,745 | B2 * | 9/2010 | Witt | A01D 34/475 180/19.3 |
| 8,047,938 | B2 * | 11/2011 | Sakai | A01D 34/6806 474/111 |
| 8,234,948 | B2 * | 8/2012 | Kohigashi | F16H 57/029 74/424 |
| 9,068,300 | B2 * | 6/2015 | Fielder | E04F 21/24 |
| 10,939,616 | B2 * | 3/2021 | Bartel | A01D 34/64 |
| 2016/0238118 | A1 * | 8/2016 | Kato | B60K 17/10 |

FOREIGN PATENT DOCUMENTS

| | | |
|---|---|---|
| JP | 05-187513 | 7/1993 |
| JP | 2012-034710 A | 2/2012 |
| JP | 4956320 B2 | 6/2012 |

OTHER PUBLICATIONS

International Search Report for PCT/JP2017/028714 (dated Oct. 3, 2017).

* cited by examiner

TRANSMISSION FOR LAWN MOWER

TECHNICAL FIELD

The present disclosure relates to a lawn mower transmission for use in a lawn mower to transmit an output of a drive source to a driving wheel.

BACKGROUND

A lawn mower has a transmission for transmitting an output of a drive source to a driving wheel. A transmission is selectively used according to the specifications of a lawn mower, such as the size of an engine as a drive source, the cutting width and the type of the driving wheel (wheel or roller), and thus a different transmission is used for each version of a lawn mower.

Therefore, an exclusive transmission having varying specifications is required for each of lawn mower models having different specifications, and, in the lawn mower manufacturing process, it is necessary to install a different transmission for each of lawn mower models having different specifications.

Patent Literature 1 listed below proposed to provide a speed change gear having a structure divided into a CVT (friction type continuously variable transmission) unit and a transmission gear unit, and to increase the versatility of the speed change gear by detaching the transmission gear unit from the CVT unit, replacing a transmission gear unit for another model and thereby modifying the speed change gear for use in another model.

CITATION LIST

Patent Literature

Patent Literature 1: Japanese Patent Application Laid-open No. H05-187513

SUMMARY

Technical Problem

However, the speed change gear disclosed in Patent Literature 1 aimed to increase the versatility of the speed change gear by replacing the transmission gear unit of a completed model with a transmission gear unit for another model, but did not intend to improve the productivity of the model. That is, at the time of production of each of models, it was necessary to install a different transmission device corresponding to each model.

The present disclosure aims to solve the above-described conventional problems, and an object of the present disclosure is to provide a transmission for a lawn mower, which makes it unnecessary to selectively use a transmission according to each model and makes it possible to improve productivity and decrease the manufacturing cost and also to reduce the installation space of a mechanism for adjusting the cutting height, and can easily cope with both the wheel version and the roller version.

Solution to Problem

In order to achieve the above object, a transmission for a lawn mower of the present disclosure is a transmission for a lawn mower, for transmitting an output of a drive source to a driving wheel, the transmission including: a speed-change transmission device; and a power transmission device movably coupled to the speed-change transmission device, wherein the power transmission device includes a first power transmission device coupled to the speed-change transmission device, and a second power transmission device to which the driving wheel is coupled, and the first power transmission device and the second power transmission device are movably coupled to each other.

In the transmission for a lawn mower of the present disclosure, the first power transmission device and the second power transmission device are movably attached, and, therefore, since the position of the rotation axis of the driving wheel in the height direction can be adjusted while adjusting the position in the front-rear direction of the rotation axis of the driving wheel coupled to the second power transmission device, the position of the rotation axis of the driving wheel can be set at a position according to the distance between the front wheel and the rear wheel (or the distance between the front wheel and the roller) of a target model in which the transmission is installed. Hence, there is no need to selectively use a transmission among models which are different in the cutting width and the wheel outer diameter, thereby improving productivity. Moreover, since the necessity of selectively using a transmission is eliminated, it possible to share parts among models, and consequently the manufacturing cost is also reduced.

Furthermore, the transmission for a lawn mower of the present disclosure does not require a significant modification like changing the specifications of the speed-change transmission device between the wheel version and the roller version, and can easily cope with both the wheel version and the roller version by partly modifying the specifications of the power transmission device, which is a subunit, according to the specifications of the driving wheel while using a common speed-change transmission device as a main unit. In this respect, the transmission for a lawn mower of the present disclosure also has the advantageous effects of improving the productivity of the lawn mower and decreasing the manufacturing cost.

In the transmission for a lawn mower of the present disclosure, each of the first power transmission device and the second power transmission device preferably has a structure including sprockets installed in a case, and a chain that meshes with the sprockets. According to this configuration, the structures of the first power transmission device and the second power transmission device constituting the power transmission device can be simplified, and therefore it is easy to modify the power transmission device according to the wheel version and the roller version, and it is possible to more easily cope with both the wheel version and the roller version.

Advantageous Effects of Invention

The advantageous effects of the present disclosure are described above, and, in summary, according to the transmission for a lawn mower of the present disclosure, it is possible to improve the productivity of the lawn mower, decrease the manufacturing cost, and reduce the installation space of a mechanism for adjusting the cutting height. In addition, according to the transmission for a lawn mower of the present disclosure, it is easy to cope with both the wheel version and the roller version by just selectively using a power transmission device.

DETAILED DESCRIPTION OF THE EMBODIMENTS

Figure 1:
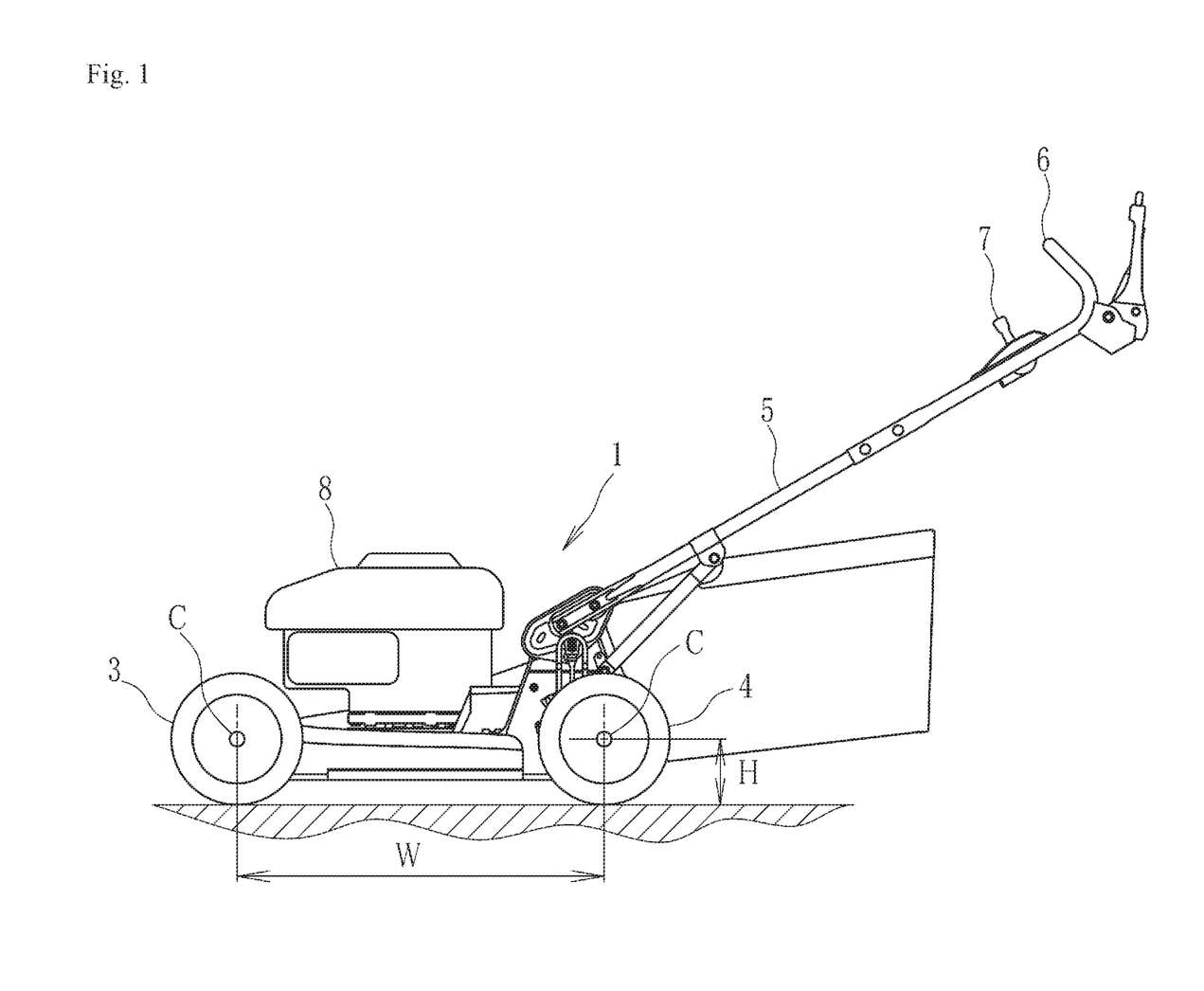
FIG. 1 is a side view of a wheel-version lawn mower according to an embodiment of the present disclosure.
Figure 2:
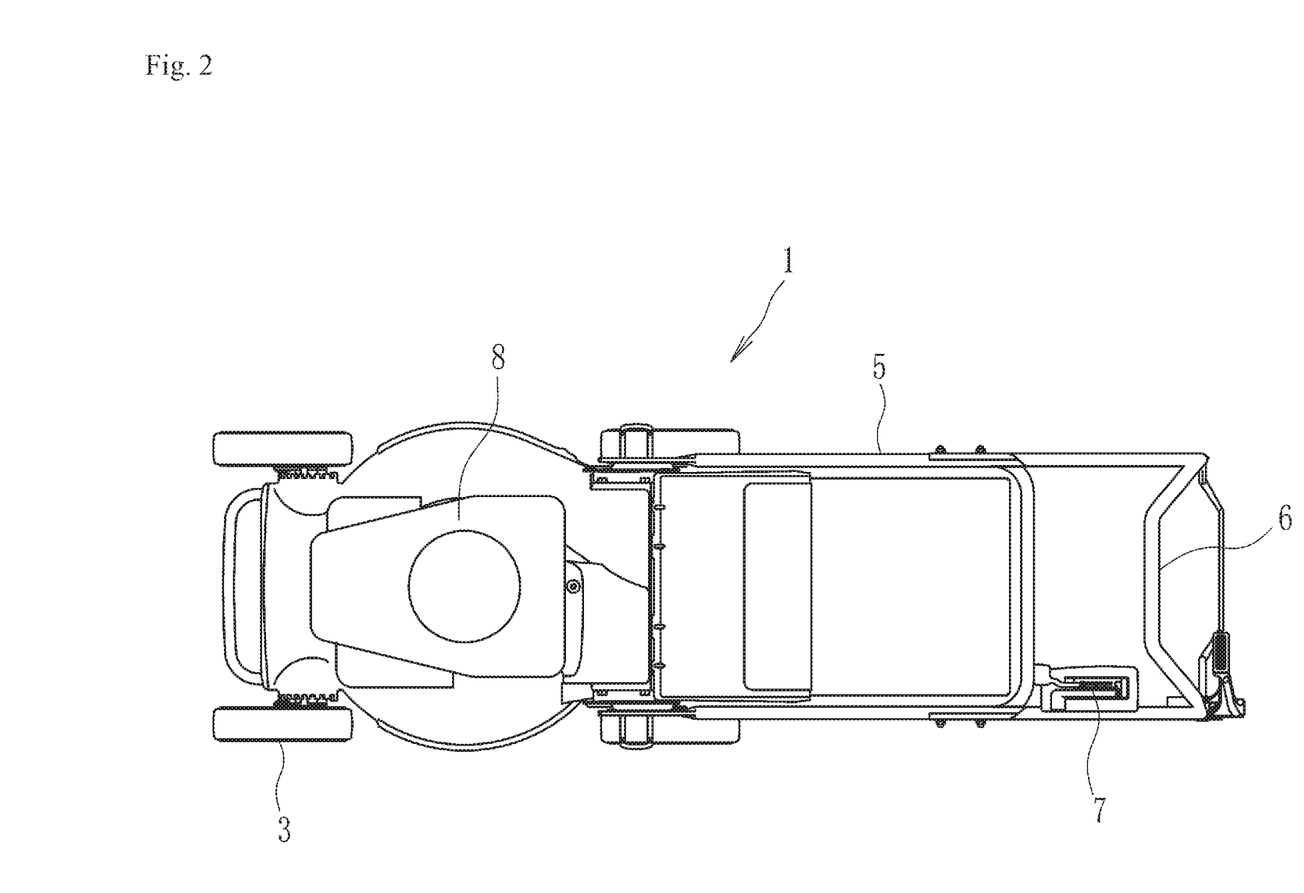
FIG. 2 is a plan view of the lawn mower illustrated in FIG. 1.

Hereinafter, an embodiment of the present disclosure will be described with reference to the drawings. FIG. 1 illustrates a side view of a lawn mower 1 according to an embodiment of the present disclosure. FIG. 2 is a plan view of the lawn mower 1 illustrated in FIG. 1. In FIGS. 1 and 2, front wheels 3 are attached in front of an engine 8, and rear wheels 4 are attached behind the engine 8. A handle 6 is provided at an end of each operating rod 5. An operating lever 7 is attached in the vicinity of the handle 6, and it is possible to operate a speed-change transmission device 11 (see FIG. 3) and freely adjust the vehicle speed by manipulating the operating lever 7.

Figure 3:
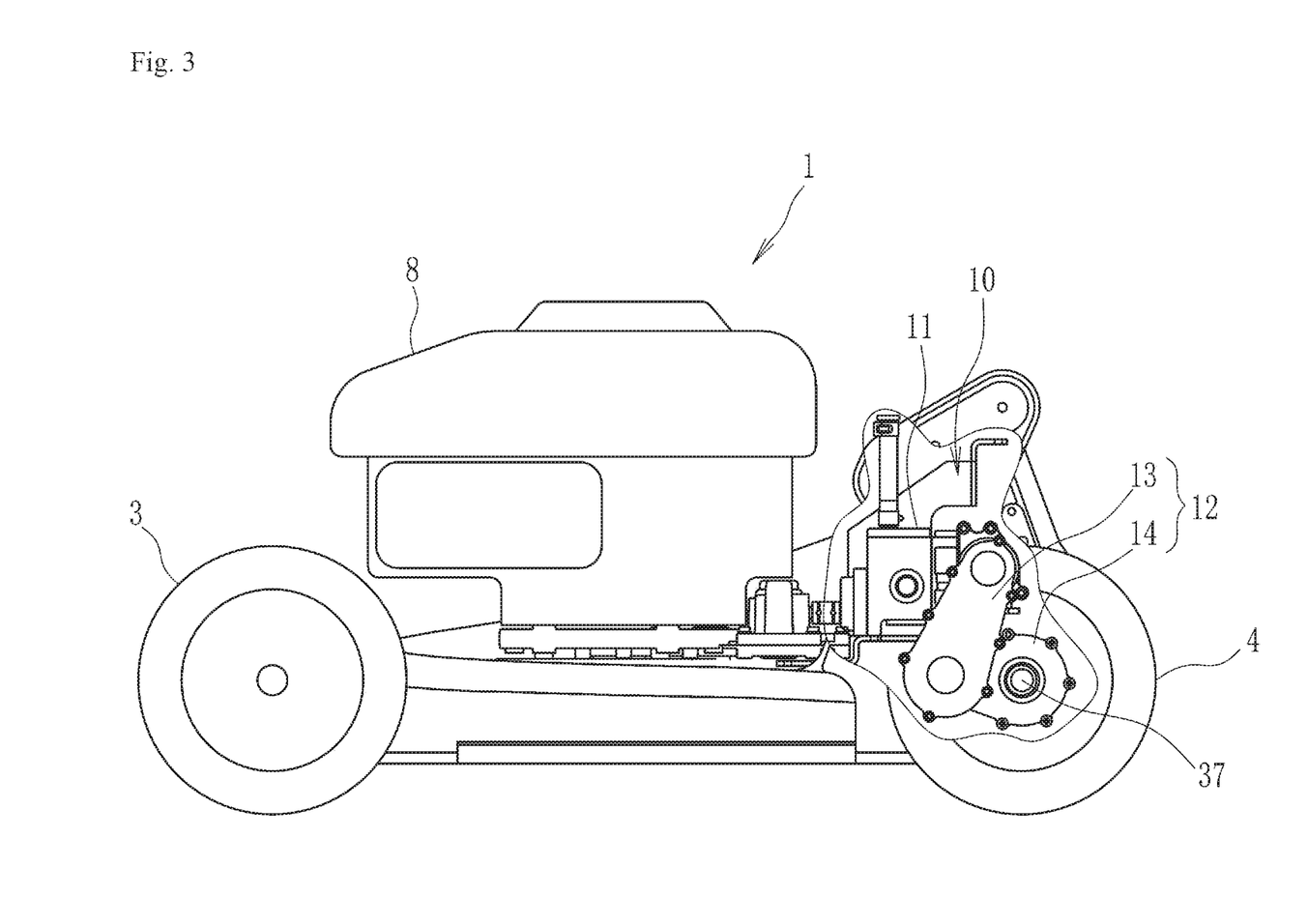
FIG. 3 is a side view of a main body section of the lawn mower illustrated in FIG. 1.
Figure 4:
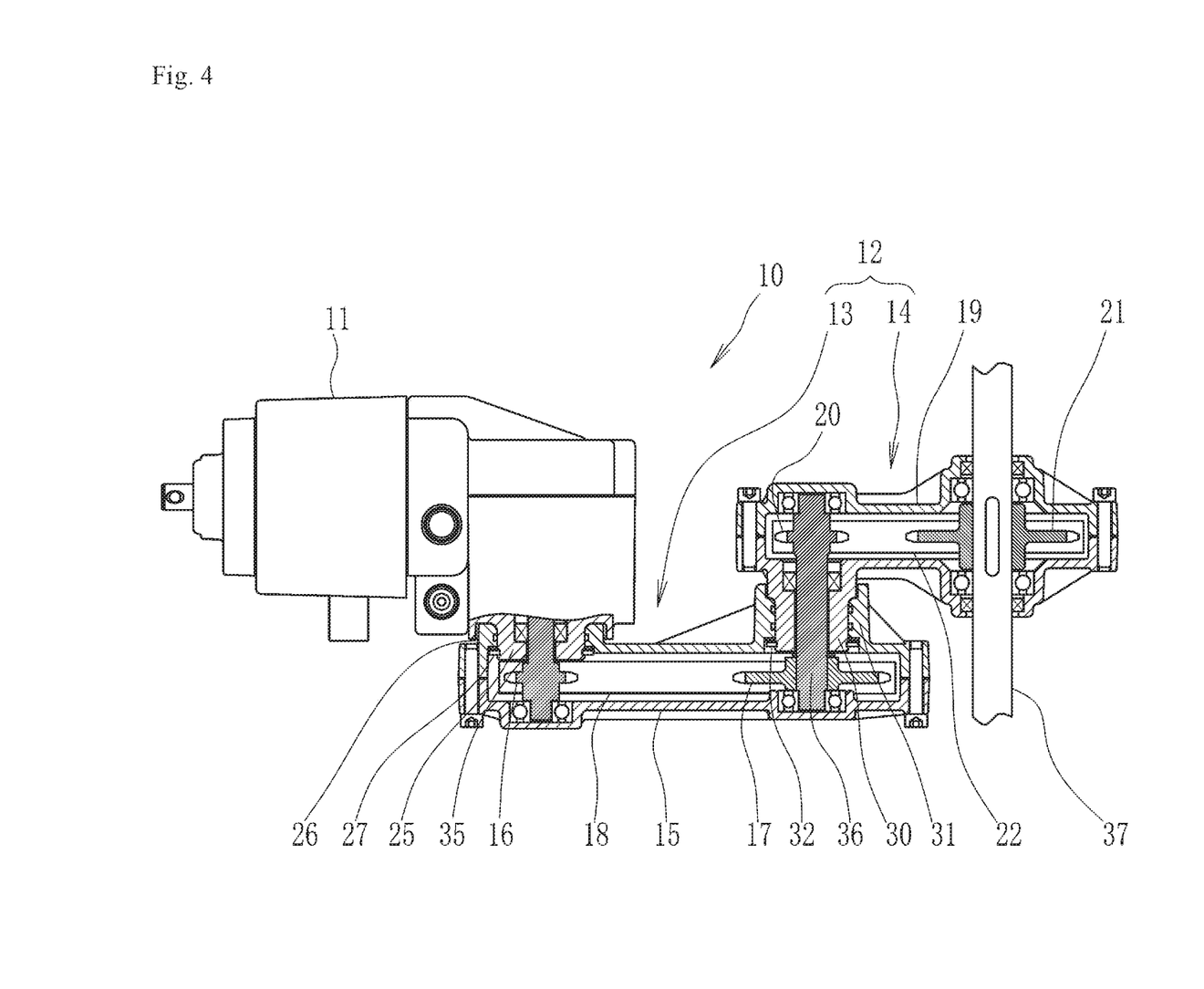
FIG. 4 is an enlarged plan view of a transmission illustrated in FIG. 3.

FIG. 3 is a side view of the main body section of the lawn mower 1 illustrated in FIG. 1. FIG. 3 is a view which is partially broken away to show a transmission 10 installed inside the lawn mower 1. FIG. 4 is an enlarged plan view of the transmission 10 illustrated in FIG. 3. In FIG. 4, the section of a power transmission device 12 is illustrated as a sectional view. In FIG. 3, the transmission 10 includes the speed-change transmission device 11 as a main unit, and the power transmission device 12 as a subunit which is coupled movably to the speed-change transmission device 11. In the present embodiment, the speed-change transmission device 11 is described as an example of HST (Hydraulic Static Transmission), but the speed-change transmission device 11 may be a gear-type speed-change transmission device as long as the speed-change transmission device exhibits a speed changing function.

In FIGS. 3 and 4, the power transmission device 12 has a first power transmission device 13 and a second power transmission device 14. The first power transmission device 13 is coupled to the speed-change transmission device 11. In FIG. 4, the first power transmission device 13 includes a sprocket 16, a sprocket 17 and a chain 18 in a case 15, and the chain 18 meshes with the sprocket 16 and the sprocket 17. In FIG. 4, the chain 18 is illustrated in a simplified manner. The sprocket 16 is integral with an output shaft 35 of the speed-change transmission device 11, and rotates together with the rotation of the output shaft 35.

In FIG. 4, the second power transmission device 14 includes a sprocket 20, a sprocket 21 and a chain 22 in a case 19, and the chain 22 meshes with the sprocket 20 and the sprocket 21. In FIG. 4, the chain 22 is illustrated in a simplified manner like the chain 18.

Moreover, in FIG. 4, the sprocket 17 and the sprocket 20 are integrated with a coupling shaft 36, and the coupling shaft 36 and the sprocket 20 rotate together with the rotation of the sprocket 17. The sprocket 21 is integral with an axle 37, the axle 37 rotates together with the rotation of the sprocket 21, and the rear wheels 4 (see FIG. 3) attached to the axle 37 are rotated.

Further, in FIG. 4, a cylindrical part 26 formed on the case 15 is rotatably coupled with a boss 25 formed on the speed-change transmission device 11, and a snap ring 27 prevents separation of the case 15 from the boss 25. Thus, the first power transmission device 13 is movably attached to the speed-change transmission device 11.

Furthermore, a cylindrical part 31 formed on the case 15 is rotatably coupled with a boss 30 formed on the case 19, and a snap ring 32 prevents the case 15 from separating from the case 19. Thus, the first power transmission device 13 and the second power transmission device 14 are relatively movably attached.

According to the configuration of the transmission 10, in FIG. 4, the sprocket 16 rotates together with the rotation of the output shaft 35 of the speed-change transmission device 11, the sprocket 17 is rotated through the chain 18, the coupling shaft 36 and the sprocket 20 rotate integrally with the sprocket 17, the sprocket 21 is rotated through the chain 22, and the rear wheel 4 (see FIG. 3) attached to the axle 37 is rotated integrally with the sprocket 21. In short, the output of the speed-change transmission device 11 is transmitted via the first power transmission device 13 and the second power transmission device 14 constituting the power transmission device 12, and the rear wheel 4 is driven.

As described above, the first power transmission device 13 and the second power transmission device 14 are relatively movably attached, and therefore the transmission 10 according to the present embodiment can improve the productivity of the lawn mower 1, and can decrease the manufacturing cost and reduce the installation space of a mechanism for adjusting the cutting height. In addition, according to the transmission 10 of the present embodiment, it is possible to easily cope with both the wheel version and the roller version by just selectively using the power transmission device 12. Hereinafter, the transmission 10 will be more specifically described while explaining these advantageous effects.

Figure 5A:
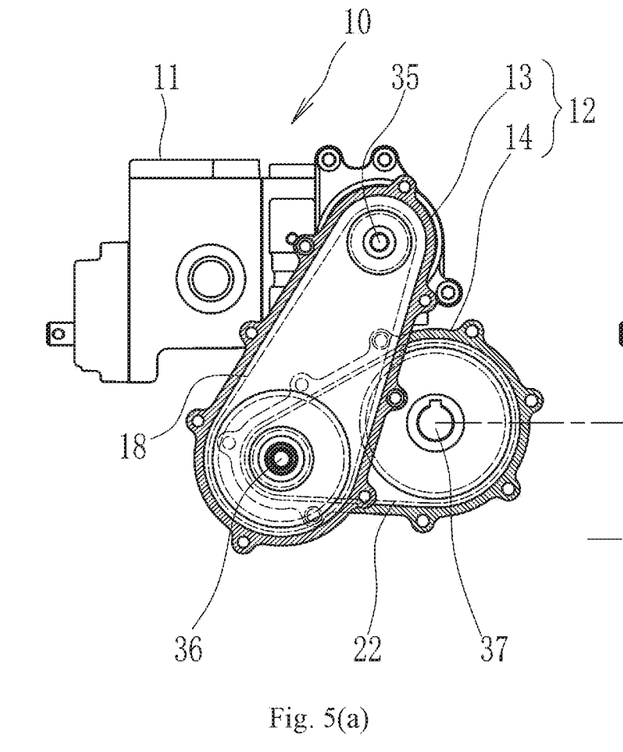
FIG. 5 is a side view illustrating a positional change of a power transmission device caused by the movement of the power transmission device in the wheel-version lawn mower according to an embodiment of the present disclosure.
Figure 5B:
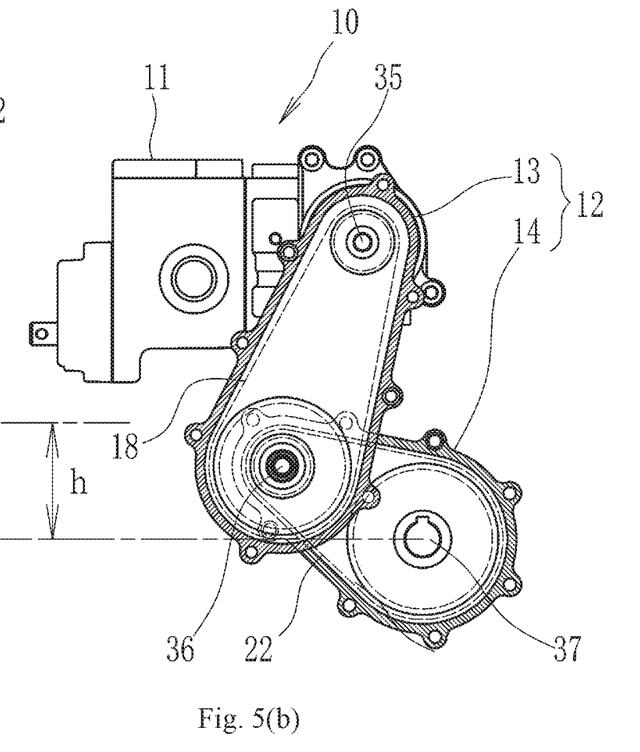

FIG. 5 is a side view illustrating a positional change of the power transmission device 12 caused by the movement of the power transmission device 12. FIG. 5 illustrates a side view of the transmission 10 in which a cross section of the power transmission device 12 is illustrated. FIG. 5(a) illustrates a state in which the axle 37 is closest to the speed-change transmission device 11. In this state, the rear wheels 4 (see FIG. 1) are lifted to the highest level with respect to the main body of the lawn mower 1, and the cutting height is the minimum. FIG. 5(b) illustrates a state in which the axle 37 is furthest away from the speed-change transmission device 11. In this state, the rear wheels 4 (see FIG. 1) are lowered to the lowest level with respect to the main body of the lawn mower 1, and the cutting height is the maximum.

Figure 6:
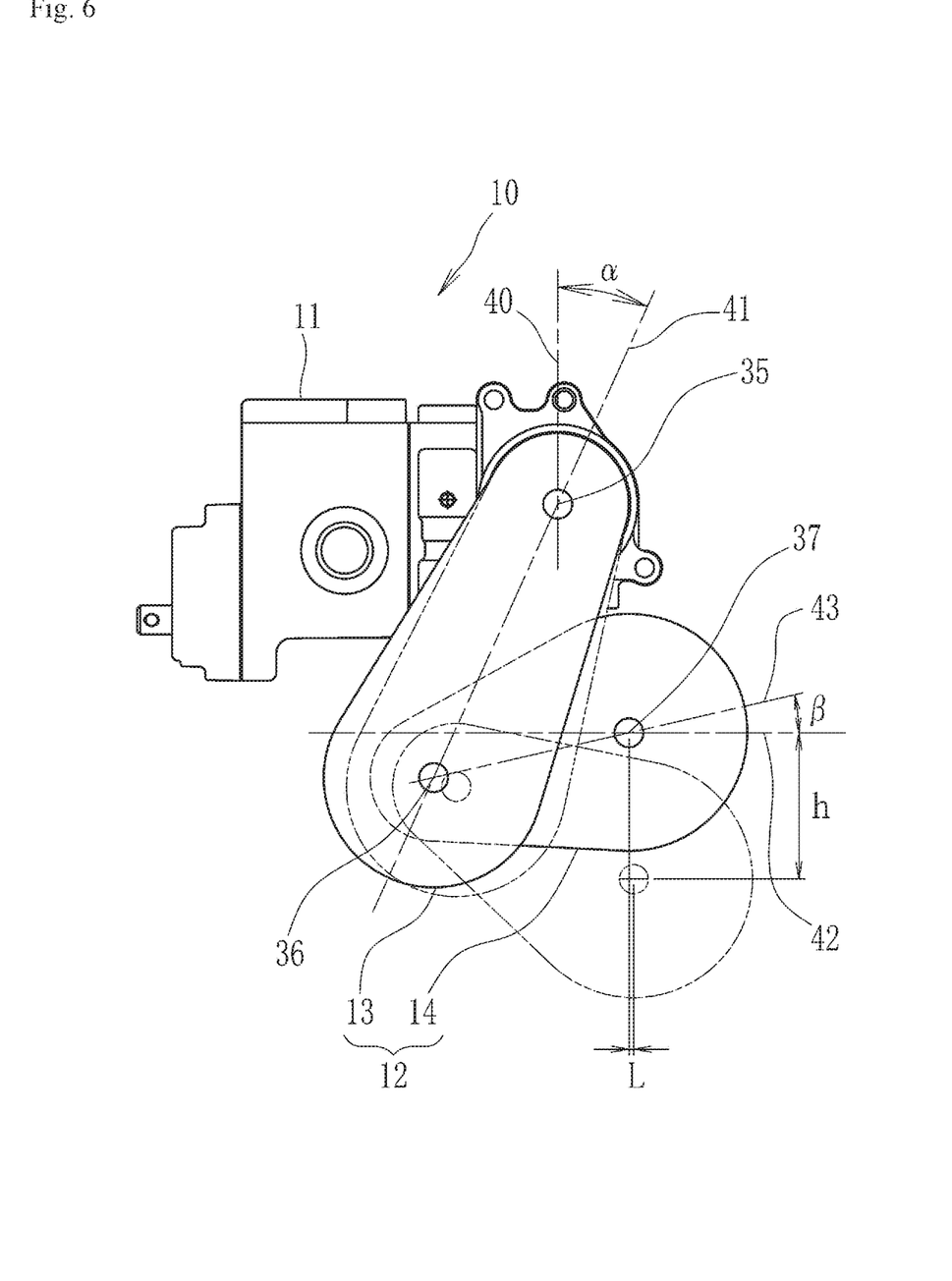
FIG. 6 is another side view illustrating a positional change of the power transmission device caused by the movement of the power transmission device in the wheel-version lawn mower according to an embodiment of the present disclosure.

FIG. 6 is another side view illustrating the positional change of the power transmission device 12 caused by the movement of the power transmission device 12. In FIG. 6, the power transmission device 12 before the positional change is indicated by the solid lines, and the power transmission device 12 after the positional change is indicated by the two-dot chain lines. The axle 37 is shifted by only h in the height direction, and is shifted by only L in the front-rear direction. In short, in the example of FIG. 6, h is the movable range in the height direction for adjusting the cutting height, and it is possible to appropriately adjust the cutting height within this movable range.

Since the adjustment of the cutting height is made possible by the movement of the first power transmission device 13 and the second power transmission device 14 constituting the power transmission device 12, there is no need to move the speed-change transmission device 11 at all. In short, since it is unnecessary to move the entire transmission 10 to adjust the cutting height, the installation space of the mechanism for adjusting the cutting height can be reduced.

Here, in FIG. 1, a distance W between the front wheel 3 and the rear wheel 4 is a distance determined by the cutting width, and is determined according to the size of a cutting blade (not shown) provided at the center of the main body of the lawn mower 1. In the example of FIG. 6, although the axle 37 is shifted by only L in the front-rear direction, the amount of shift is small, and it is possible to adjust the cutting height without significantly changing the distance W.

Since the distance W is a distance determined by the cutting width as described above, the distance W varies between models of different cutting widths (for example, the 19-inch version and the 21-inch version of the distance W). Moreover, in FIG. 1, the height H to the center C of the front wheel 3 and the rear wheel 4 from the ground contact surface also varies between models which are different in the outer diameters of the front wheel 3 and the rear wheel 4 (for example, the 8-inch version of the outer diameter and the 9.6-inch version of the outer diameter). In the present embodiment, there is no need to selectively use the transmission 10 among models which are different in the cutting width and the wheel outer diameter.

Specifically, in the transmission 10, in FIG. 6, since the first power transmission device 13 is attached movably with respect to the speed-change transmission device 11 as described above, an angle α (the angle formed by a perpendicular line 40 and a center line 41 of the first power transmission device 13) can be adjusted, and since the first power transmission device 13 and the second power transmission device 14 are relatively movably attached as described above, an angle β (the angle formed by a horizontal line 42 and a center line 43 of the second power transmission device 14) can be adjusted.

Thus, since the position of the axle 37 in the height direction can be adjusted while adjusting the position of the axle 37 in the front-rear direction, the position of the axle 37 can be set at a position according to the distance W and the wheel height H of a corresponding model. Consequently, as described above, there is no need to selectively use the transmission 10 among models which are different in the cutting width and the wheel outer diameter, and it is possible to improve the productivity. In addition, since it is unnecessary to selectively use the transmission 10, it is possible to share parts among models, thereby decreasing the manufacturing cost.

In the above-described embodiment, the lawn mower 1 is described as a wheel version, but in the following embodiment, the lawn mower 1 is described as a roller-version. Even in the case where the lawn mower 1 is of the roller-version, the main parts are the same as those in the wheel version, and therefore the descriptions thereof are omitted by designating the same parts with the same reference numerals, and only the parts unique to the roller-version will be described.

Figure 7:
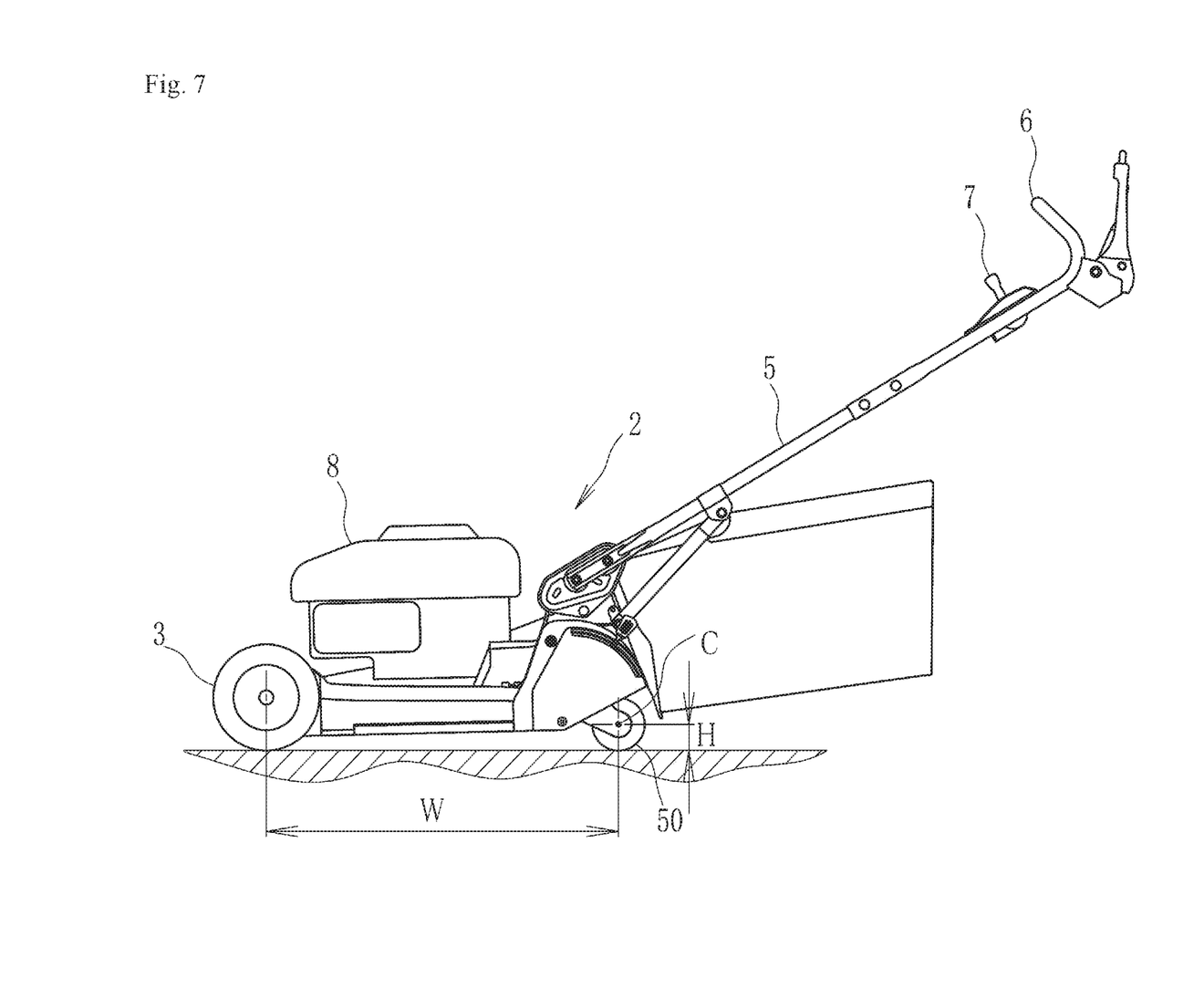
FIG. 7 is a side view of a roller-version lawn mower according to an embodiment of the present disclosure.
Figure 8:
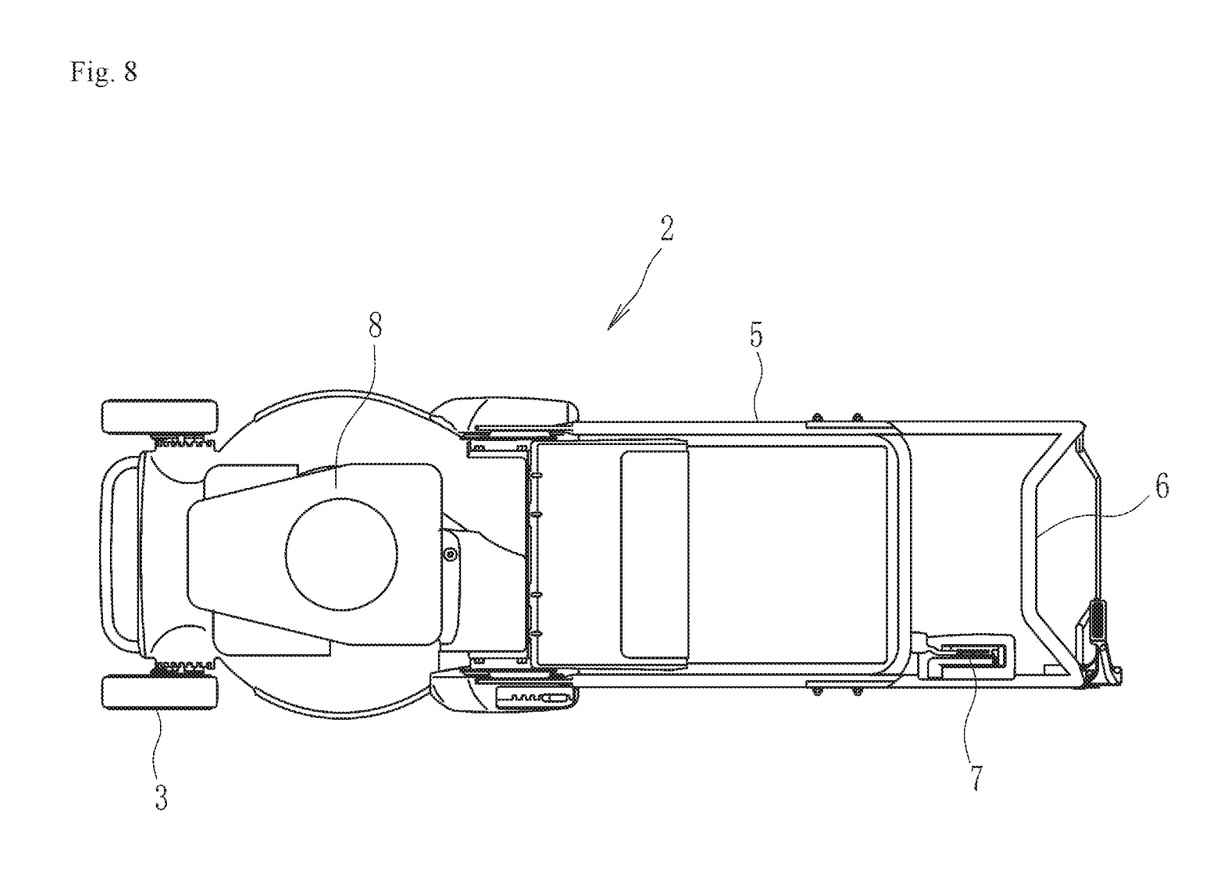
FIG. 8 is a plan view of the lawn mower illustrated in FIG. 7.
Figure 9:
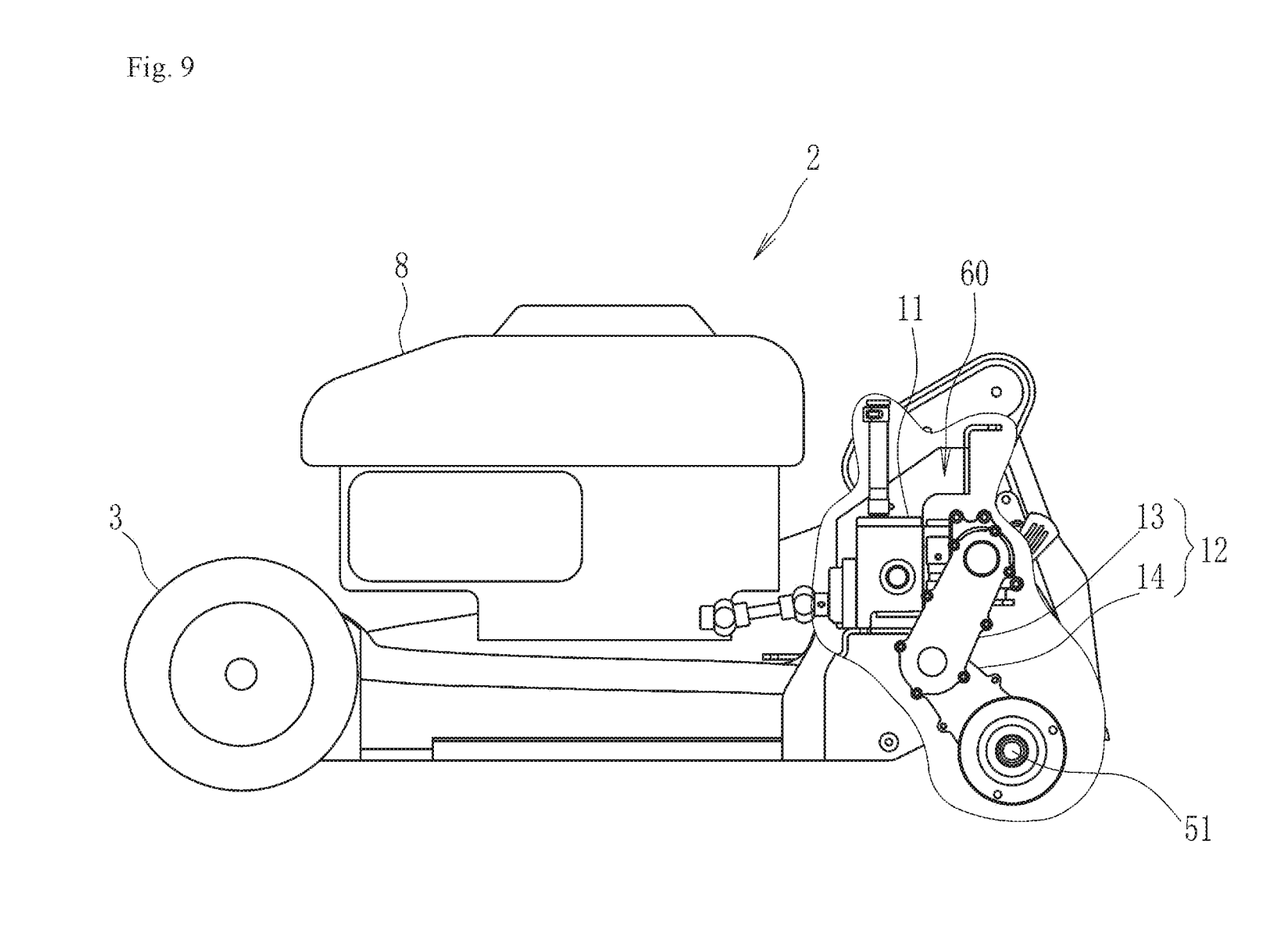
FIG. 9 is a side view of the main body section of the lawn mower illustrated in FIG. 7.
Figure 10:
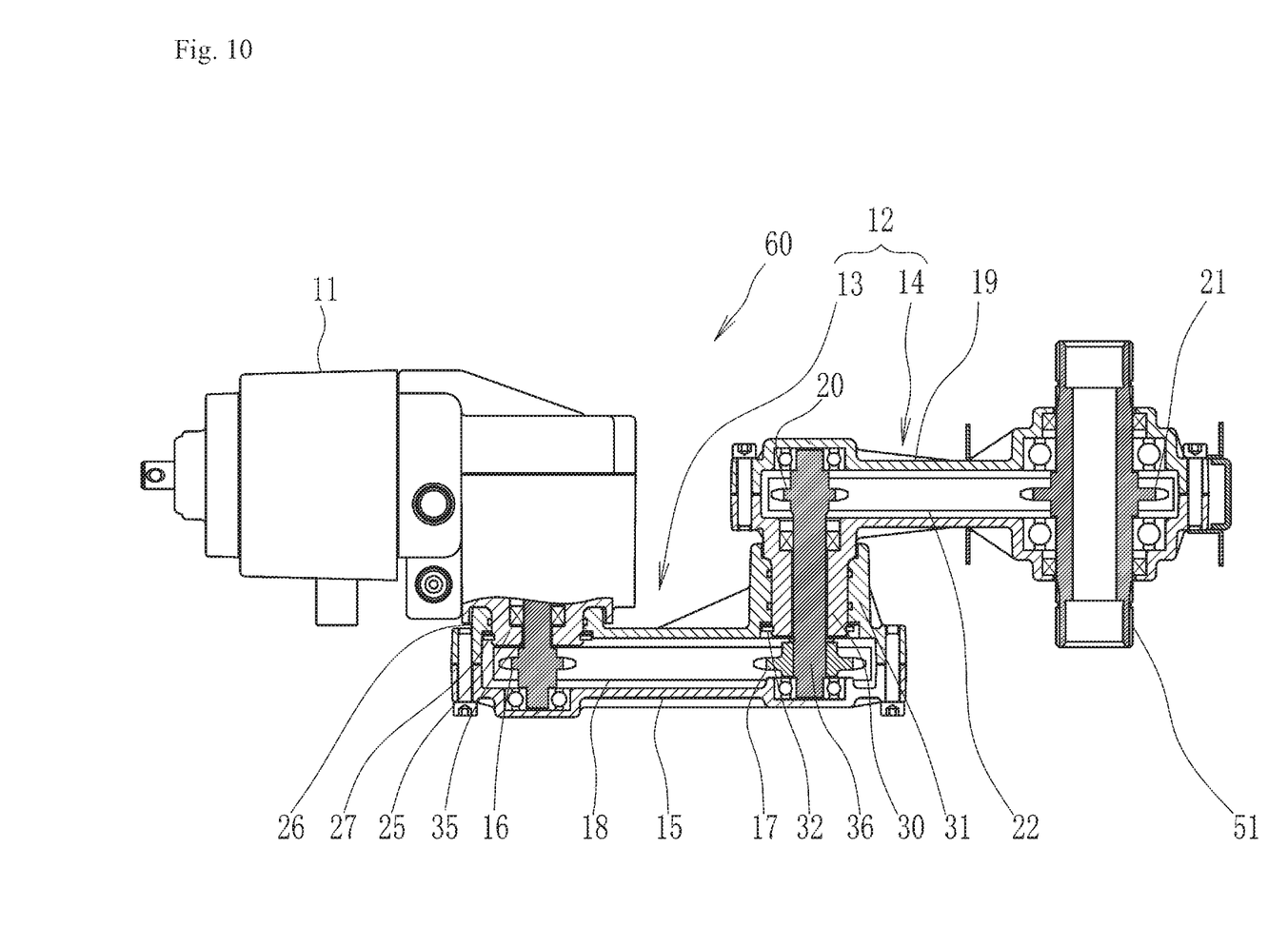
FIG. 10 is an enlarged plan view of a transmission illustrated in FIG. 9.

FIG. 7 illustrates a side view of a lawn mower 2 according to a roller-version embodiment. FIG. 8 is a plan view of the lawn mower 2 illustrated in FIG. 7. In FIGS. 7 and 8, the front wheels 3 are attached in front of the engine 8, and a roller 50 is attached behind the engine 8 as illustrated in FIG. 7. FIG. 9 is a side view of the main body section of the lawn mower 2 illustrated in FIG. 7. FIG. 9 is a view which is partially broken away to show a transmission 60 installed inside the lawn mower 2. FIG. 10 is an enlarged plan view of the transmission 60 illustrated in FIG. 9. In FIG. 10, similarly to FIG. 4, the section of the power transmission device 12 is illustrated as a sectional view.

In FIG. 9, the transmission 60 is configured by the speed-change transmission device 11 and the power transmission device 12 which is movably coupled to the speed-change transmission device 11. Similarly to the transmission 10 illustrated in FIG. 3, the power transmission device 12 includes the first power transmission device 13 and the second power transmission device 14. The transmission 10 illustrated in FIG. 3 is a version in which the rear wheels 4 as wheels are attached to the axle 37 attached to the second power transmission device 14, whereas the transmission 60 illustrated in FIG. 9 is a version in which the roller 50 (see FIG. 7 as the roller 50 is not illustrated in FIG. 9) is attached to a roller shaft 51 attached to the second power transmission device 14. Thus, the specifications of the power transmission device 12 differ between FIG. 3 and FIG. 9, but, as illustrated in FIG. 10, the basic configuration is the same. Therefore, the power transmission device 12, the first power transmission device 13 and the second power transmission device 14, and internal components thereof are designated with the same correspondences, and the descriptions of the structures and operations thereof will be omitted.

Figure 11A:
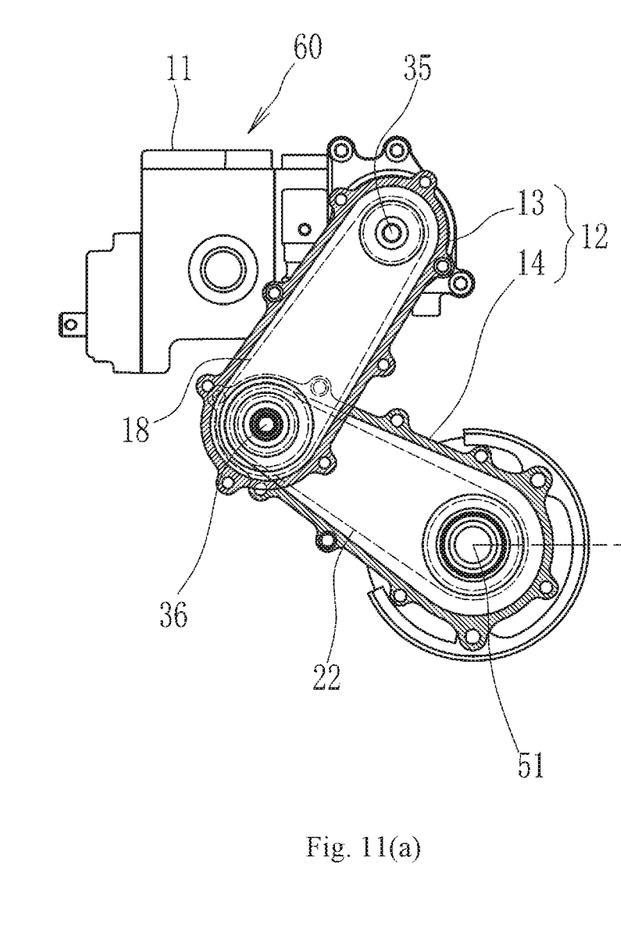
FIG. 11 is a side view illustrating a positional change of a power transmission device caused by the movement of the power transmission device in the roller-version lawn mower according to an embodiment of the present disclosure.
Figure 11B:
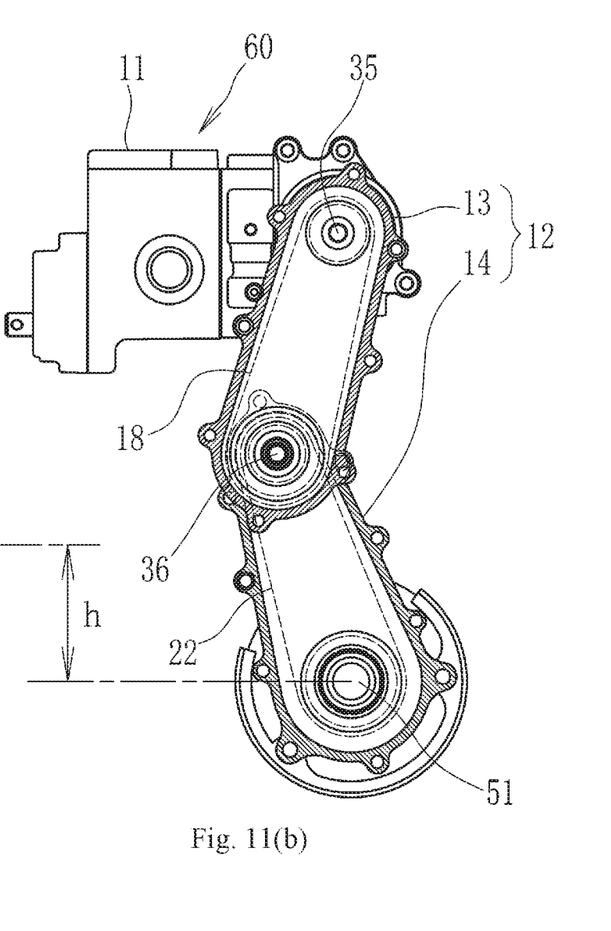

FIG. 11 is a side view illustrating the positional change of the power transmission device 12 caused by the movement of the power transmission device 12. Similarly to FIG. 5, FIG. 11 illustrates a side view of the transmission 60 in which a cross section of the power transmission device 12 is shown. FIG. 11(a) illustrates a state in which the roller shaft 51 is closest to the speed-change transmission device 11. In this state, the roller 50 (see FIG. 7) is in the state of being lifted to its highest level with respect to the main body of the lawn mower 2, and the cutting height is the minimum. FIG. 11(b) illustrates a state in which the roller shaft 51 is furthest away from the speed-change transmission device 11. In this state, the roller 50 (see FIG. 7) is in the state of being lowered to its lowest level with respect to the main body of the lawn mower 2, and the cutting height is the maximum.

Figure 12:
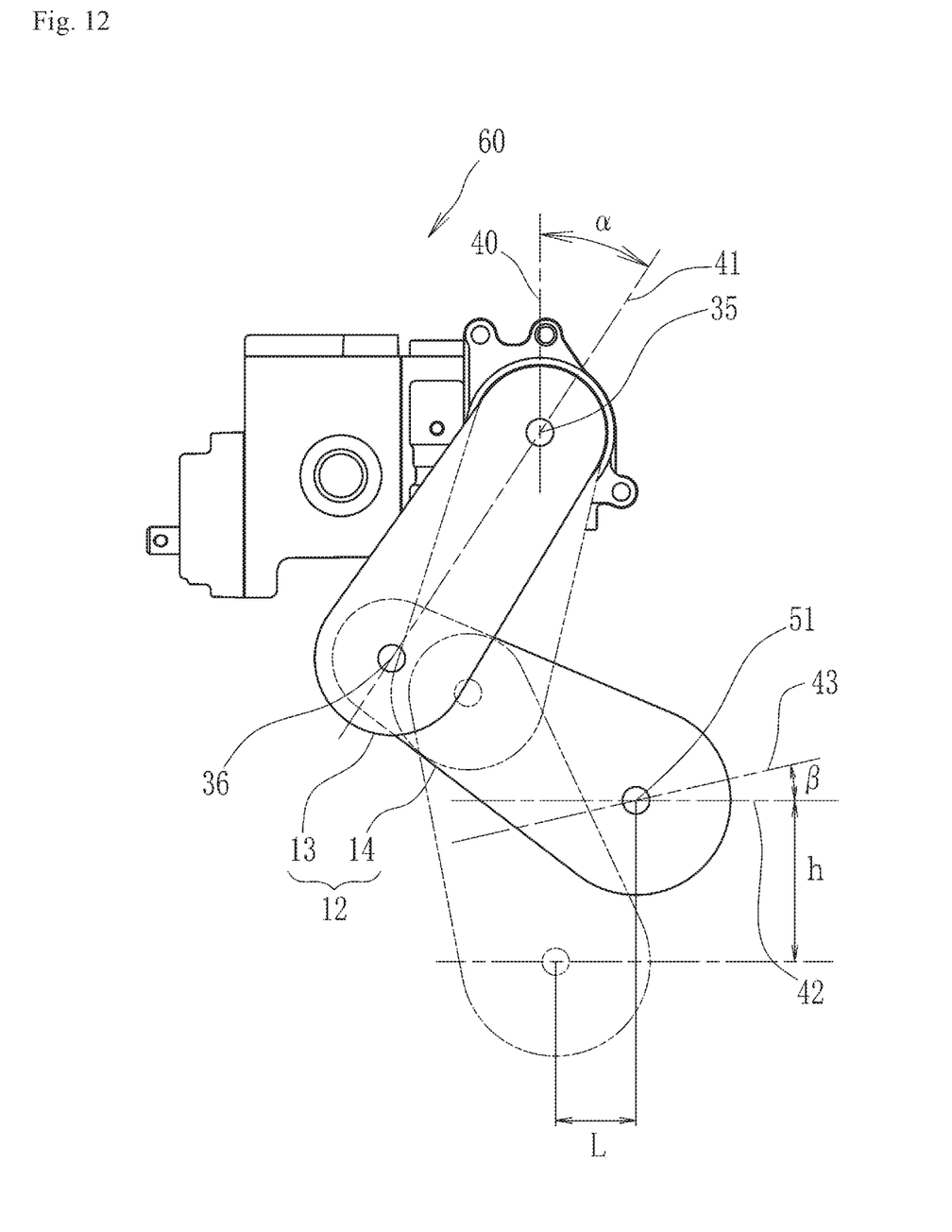
FIG. 12 is another side view illustrating a positional change of the power transmission device caused by the movement of the power transmission device in the roller-version lawn mower according to an embodiment of the present disclosure.

FIG. 12 is another side view illustrating the positional change of the power transmission device 12 caused by the movement of the power transmission device 12. In FIG. 12, similarly to FIG. 6, the power transmission device 12 before the positional change is indicated by the solid lines, and the power transmission device 12 after the positional change is indicated by the two-dot chain lines. The roller shaft 51 is shifted by only h in the height direction, and is shifted by only L in the front-rear direction. In short, in the example of FIG. 12, similarly to the example of FIG. 6, h is the movable range in the height direction for adjusting the cutting height, and it is possible to appropriately adjust the cutting height within this movable range.

As described above, since the basic configuration and the basic operation of the transmission 60 for roller version are the same as those of the above-described transmission 10 for wheel version, the advantageous effects thereof are the same as those of the transmission 10 for wheel version. In short, with the transmission 60 for roller version, it is also possible to improve the productivity of the lawn mower 2, decrease the manufacturing cost, and reduce the installation space of the mechanism for adjusting the cutting height.

Although both the transmission 10 for wheel version and the transmission 60 for roller version have been described by the above respective embodiments, the basic configuration is common to both, and the difference between the transmission 10 and the transmission 60 is that the specifications of the power transmission device 12 are for the wheel version, or for the roller version. In short, in the transmission according to the present embodiment, it is unnecessary to significantly change the specifications of the speed-change transmission device 11 between the wheel version and the roller version, and it is possible to easily cope with both the wheel version and the roller version by partly modifying the specifications of the power transmission device 12 as the subunit according to the specifications of the driving wheel while sharing the speed-change transmission device 11 as the main unit. Also in this respect, the transmission according to the present embodiment makes it possible to achieve the advantageous effects of improving the productivity of the lawn mower and decreasing the manufacturing cost.

While the embodiments of the present disclosure have been described, these embodiments are merely examples and may be modified as appropriate. Further, although the descriptions of the internal structure of the speed-change transmission device 11 and the mechanism for adjusting the cutting height are omitted, existing devices and mechanisms may be appropriately used.

REFERENCE SIGNS LIST 1, 2 Lawn mower
3 Front wheel
4 Rear wheel
8 Engine (drive source)
10, 60 Transmission
11 Speed-change transmission device
12 Power transmission device
13 First power transmission device
14 Second power transmission device
50 Roller

What is claimed is:

1. A transmission for a lawn mower, for transmitting an output of a drive source to a driving wheel, the transmission comprising:
   a speed-change transmission device; and
   a power transmission device movably coupled to the speed-change transmission device, wherein
   the power transmission device includes a first power transmission device coupled to the speed-change transmission device, and a second power transmission device to which the driving wheel is coupled, and
   the first power transmission device and the second power transmission device are movably coupled to each other to adjust a position of a rotation axis of the driving wheel in a height direction while adjusting the position in a front-rear direction of the rotation axis of the driving wheel coupled to the second power transmission device, whereby setting the position of the rotation axis of the driving wheel according to a cutting width and an outer diameter of the driving wheel of a target model of the lawn mower in which the transmission for the lawn mower is installed, and eliminating necessity of selectively using different transmissions for the lawn mower among different models of the lawn mower which are different in the cutting width and the outer diameter of the driving wheel.

2. The transmission for a lawn mower according to claim 1, wherein each of the first power transmission device and the second power transmission device is a structure comprising sprockets installed in a case, and a chain that meshes with the sprockets.

3. A transmission for a lawn mower, for transmitting an output of a drive source to a driving wheel, the transmission comprising:
   a speed-change transmission device comprising a first boss; and
   a power transmission device movably coupled to the speed-change transmission device comprising:
      a first case comprising:
         a first cylindrical part rotatably accepting the first boss;
         a second cylindrical part;
         a first snap ring preventing separation of the first boss from the first case; and
         a first power transmission device movably coupled to the speed-change transmission device with an output shaft rotatably penetrating through the first boss, and
      a second case comprising:
         a second boss rotatably accepted by the second cylindrical part;
         a second snap ring preventing separation of the second boss from the first case; and
         a second power transmission device to which the driving wheel is movably coupled with an axle,
   wherein the first power transmission device is movably coupled with the second power transmission device with a coupling shaft penetrating through the second boss, and
   the first power transmission device comprises a first set of sprockets installed in the first case and a first chain that meshes with the first set of the sprockets and the second power transmission device comprises a second set of sprockets installed in the second case and a second chain that meshes with the second set of the sprockets.

4. The transmission for a lawn mower according to claim 3, wherein when viewed in a direction parallel to a rotation axis of the axle, a position of the axle shifts in a height direction and a front-rear direction.

5. The transmission for a lawn mower according to claim 3, wherein the lawn mower comprises a roller shaft in lieu of the axle.

* * * * *